(12) United States Patent
Cunningham et al.

(10) Patent No.: US 10,315,513 B2
(45) Date of Patent: *Jun. 11, 2019

(54) WHEELCHAIR DRIVE BOOST

(71) Applicant: High Stone Technologies, LLC, Wexford, PA (US)

(72) Inventors: Sally Cunningham, Wexford, PA (US); Steven Cunningham, Wexford, PA (US); Faith Quist, Baltimore, MD (US); Caitlin Sharkey, Pittsburgh, PA (US); Leslie Wines, Manassas, VA (US)

(73) Assignee: High Stone Technologies, LLC, Wexford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,074

(22) Filed: Jul. 16, 2018

(65) Prior Publication Data

US 2018/0319274 A1 Nov. 8, 2018

Related U.S. Application Data

(63) Continuation of application No. 15/090,161, filed on Apr. 4, 2016.
(Continued)

(51) Int. Cl.
*A61G 5/02* (2006.01)
*B60K 17/02* (2006.01)
*A61G 5/10* (2006.01)

(52) U.S. Cl.
CPC ............. *B60K 17/02* (2013.01); *A61G 5/022* (2013.01); *A61G 5/025* (2013.01); *A61G 5/027* (2013.01); *A61G 5/1008* (2013.01); *A61G 5/1018* (2013.01)

(58) Field of Classification Search
CPC ........ B60K 17/02; A61G 5/022; A61G 5/025; A61G 5/027; B62M 1/16
See application file for complete search history.

(56) References Cited

U.S. PATENT DOCUMENTS 2,544,831 A 3/1951 Guyton
2,576,413 A 11/1951 Padjen
(Continued)

FOREIGN PATENT DOCUMENTS

CA 2359487 A1 7/2000
CA 2318927 C 5/2007
(Continued)

OTHER PUBLICATIONS

Non-final Office Action dated Feb. 13, 2018 in corresponding U.S. Appl. No. 15/258,149.
(Continued)

*Primary Examiner* — Joseph M Rocca
*Assistant Examiner* — Michael R Stabley
(74) *Attorney, Agent, or Firm* — Dinsmore & Shohl, LLP (57) ABSTRACT

Wheelchair drive boost apparatuses, drive assisted wheelchairs, and wheelchair drive boost systems are disclosed. A wheelchair drive boost apparatus includes a housing, a drive wheel including a drive axis that is movable with respect to the housing, a drive lever that engages with the drive wheel to cause the drive wheel to rotate, a transmission that couples the drive lever to the drive wheel, and an engager having a first position and a second position. The engager is configured to move the drive axis with respect to the housing.

17 Claims, 7 Drawing Sheets

Related U.S. Application Data (60) Provisional application No. 62/215,725, filed on Sep. 8, 2015.

(56) References Cited

U.S. PATENT DOCUMENTS

| | | | |
|---|---|---|---|
| 2,578,828 A | 11/1951 | Nelson | |
| 2,643,898 A | 6/1953 | Everest et al. | |
| 2,798,565 A | 7/1957 | Rosenthal et al. | |
| 3,189,368 A | 6/1965 | Petersen | |
| 3,301,574 A | 1/1967 | Good | |
| 3,309,110 A | 3/1967 | Buhner | |
| 3,623,748 A | 11/1971 | Haynes | |
| 3,666,292 A | 5/1972 | Bartos | |
| 3,869,146 A | 3/1975 | Bulmer | |
| 3,917,311 A | 11/1975 | Wada | |
| 3,994,509 A | 11/1976 | Schaeffer | |
| 4,037,676 A | 7/1977 | Ruse | |
| 4,098,521 A | 7/1978 | Ferguson et al. | |
| 4,223,041 A | 9/1980 | Pigerol et al. | |
| 4,354,691 A | 10/1982 | Saunders et al. | |
| 4,453,729 A | 6/1984 | Lucken | |
| 4,503,724 A | 3/1985 | Ward | |
| 4,583,754 A | 4/1986 | Seeliger | |
| 4,652,026 A | 3/1987 | Byrge | |
| 4,705,284 A | 11/1987 | Stout | |
| 4,762,332 A | 8/1988 | Seol | |
| 4,805,711 A | 2/1989 | Lautzenhiser | |
| 4,811,964 A | 3/1989 | Horn | |
| 4,840,076 A | 6/1989 | Brubaker et al. | |
| 4,865,344 A | 9/1989 | Romero, Sr. et al. | |
| 4,892,323 A | 1/1990 | Oxford et al. | |
| 4,961,473 A | 10/1990 | Jones | |
| 4,962,942 A | 10/1990 | Barnett et al. | |
| 4,993,732 A | 2/1991 | Wedemeyer | |
| 5,007,655 A | 4/1991 | Hanna | |
| 5,037,120 A | 8/1991 | Parisi | |
| 5,078,227 A | 1/1992 | Becker | |
| 5,242,179 A | 9/1993 | Beddome | |
| 5,263,729 A | 11/1993 | Watwood | |
| 5,301,971 A | 4/1994 | Brereton | |
| 5,303,945 A | 4/1994 | Oxford | |
| 5,404,044 A | 3/1995 | Galumbeck | |
| 5,499,833 A | 3/1996 | Her et al. | |
| 5,632,499 A | 5/1997 | Hutcherson et al. | |
| 5,743,544 A | 4/1998 | Weaver | |
| 5,826,897 A | 10/1998 | Beard | |
| 5,865,455 A | 2/1999 | Taylor | |
| 5,941,547 A | 8/1999 | Drake | |
| 6,007,082 A | 12/1999 | Watwood et al. | |
| 6,158,757 A | 12/2000 | Tidcomb | |
| 6,173,986 B1 | 1/2001 | Sicher | |
| 6,224,078 B1 | 5/2001 | Tidcomb | |
| 6,234,504 B1 | 5/2001 | Taylor | |
| 6,371,502 B1 | 4/2002 | Howlett et al. | |
| 6,715,780 B2 | 4/2004 | Schaeffer et al. | |
| 6,755,430 B1 | 6/2004 | Watwood et al. | |
| 6,820,885 B1 | 11/2004 | Oshimo | |
| 6,889,991 B1 | 5/2005 | Facer et al. | |
| 7,398,989 B2 | 7/2008 | Laffin | |
| 7,556,274 B2 | 7/2009 | Mittelstaedt | |
| 7,900,945 B1 | 3/2011 | Rackley | |
| 7,963,539 B1 | 6/2011 | Baker | |
| 8,087,684 B2 | 1/2012 | Bloswick et al. | |
| 8,186,699 B2 | 5/2012 | Green | |
| 8,657,319 B1 | 2/2014 | Cullen et al. | |
| 9,010,786 B1 | 4/2015 | Ekelem et al. | |
| 9,370,454 B1 | 6/2016 | Parker | |
| 9,398,988 B1 | 7/2016 | DeMirza | |
| 9,408,762 B1 | 8/2016 | Baker | |
| 2002/0053778 A1 | 5/2002 | Howard | |
| 2002/0145271 A1 | 10/2002 | Sanchez | |
| 2002/0153691 A1 | 10/2002 | Liao et al. | |
| 2003/0030244 A1 | 2/2003 | Choi | |
| 2003/0071435 A1 | 4/2003 | Schaeffer et al. | |
| 2004/0104554 A1 | 6/2004 | Watwood et al. | |
| 2005/0275190 A1 | 12/2005 | Pettit | |
| 2006/0097473 A1 | 5/2006 | DeFrance | |
| 2006/0170182 A1 | 8/2006 | Mlttelstaedt | |
| 2006/0208452 A1 | 9/2006 | Mittelstaedt | |
| 2006/0261571 A1 | 11/2006 | Mitchell | |
| 2006/0288810 A1 | 12/2006 | Vroom | |
| 2007/0024021 A1 | 2/2007 | Rand et al. | |
| 2007/0052196 A1 | 3/2007 | Taylor | |
| 2008/0023932 A1 | 1/2008 | Baumbach et al. | |
| 2008/0073869 A1 | 3/2008 | Patterson | |
| 2008/0179855 A1 | 7/2008 | Wang et al. | |
| 2008/0238022 A1 | 10/2008 | Kylstra et al. | |
| 2008/0238023 A1 | 10/2008 | Bloom | |
| 2008/0252036 A1 | 10/2008 | Smurthwaite | |
| 2009/0051139 A1 | 2/2009 | Kylstra et al. | |
| 2009/0206574 A1 | 8/2009 | Green | |
| 2009/0283982 A1 | 11/2009 | Thomas | |
| 2010/0156063 A1 | 6/2010 | Green | |
| 2010/0200311 A1 | 8/2010 | Huang et al. | |
| 2011/0248467 A1 | 10/2011 | Ball et al. | |
| 2012/0012417 A1 | 1/2012 | Baker | |
| 2012/0061939 A1 | 3/2012 | Diaz-Ortiz et al. | |
| 2012/0132497 A1 | 5/2012 | Jansen et al. | |
| 2014/0346752 A1 | 11/2014 | Rasmussen | |
| 2015/0060156 A1 | 3/2015 | Husted et al. | |
| 2015/0190292 A1 | 7/2015 | Robins | |

FOREIGN PATENT DOCUMENTS

| | | |
|---|---|---|
| WO | 8503265 A1 | 8/1985 |
| WO | 1995008314 A2 | 3/1995 |
| WO | 9703302 A1 | 1/1997 |
| WO | 2002074219 A2 | 9/2002 |
| WO | 2004014281 A1 | 2/2004 |
| WO | 2006116623 A2 | 11/2006 |

OTHER PUBLICATIONS

International Search Report and Written Opinion dated Oct. 6, 2016 pertaining to International Application No. PCT/US2016/042269.

"Lever-Powered Wheelchair", http://web.mit.edu/egilbert/www/ewg/wheelchair.html, Published/Accessed Jun. 15, 2016.

Non-final Office Action pertaining to U.S. Appl. No. 15/090,161 dated Apr. 26, 2018.

Final Office Action pertaining to U.S. Appl. No. 15/090,161 dated Nov. 24, 2017.

Non-final Office Action pertaining to U.S. Appl. No. 15/090,161 dated May 17, 2017.

WHEELCHAIR DRIVE BOOST

CROSS-REFERENCE TO RELATED APPLICATION

The present application is a continuation of U.S. patent application Ser. No. 15/090,161, entitled "Wheelchair Drive Boost" and filed on Apr. 4, 2016, which claims priority to U.S. Provisional Patent Application Ser. No. 62/215,725, filed Sep. 8, 2015 and entitled "Wheelchair Drive Boost," the disclosures of which are expressly incorporated by reference herein in their respective entireties.

TECHNICAL FIELD

The present specification generally relates to wheelchair drive assistive devices and, more specifically, systems, apparatuses, and methods for manually providing forward propulsion on a wheelchair.

BACKGROUND

Some users of wheelchairs, particularly aged or infirm users, sometimes have difficulty delivering sufficient force to propel a manual wheelchair forward, especially in particular circumstances. For example, certain floor features or obstacles, such as a threshold, an irregular floor covering, an inconsistent floor covering, a slope, and/or the like, may make it difficult for a user to supply enough force to propel the wheelchair forward over the floor features.

Previous solutions to such an issue have resulted in wheelchairs that have powered components to provide the extra necessary force to propel the wheelchair. However, such powered components are complex, heavy, expensive, and are not easily adapted to manual wheelchairs. In addition, certain medical providers may balk at providing a wheelchair with powered components thereon when it is not medically necessary for the user (i.e., the user is otherwise able to operate a manual wheelchair).

Other solutions have included mechanical force multipliers, such as long movement levers or the like, are capable of providing a force to the wheels of a wheelchair that is greater than the force that a user can provide directly. However, such mechanical force multipliers must be used all of the time, rather than just in particular circumstances when additional boost is necessary. In addition, such mechanical force multipliers hinder normal operation when no floor feature or obstacle is present.

Accordingly, a need exists for devices, systems, and methods that are capable of providing additional force for the propulsion of a wheelchair over certain floor features or obstacles, but do not hinder regular manual operation of the wheelchair. In addition, a need exists for devices, systems, and methods that are non-complex, lightweight, inexpensive, and can easily be adapted for an existing wheelchair as an aftermarket attachment.

SUMMARY

In one embodiment, a wheelchair drive boost apparatus includes a housing, a drive wheel including a drive axis that is movable with respect to the housing, a drive lever that engages with the drive wheel to cause the drive wheel to rotate, a transmission that couples the drive lever to the drive wheel, and an engager having a first position and a second position. The engager is configured to move the drive axis with respect to the housing.

In another embodiment, a drive-assisted wheelchair includes a wheel, a drive lever coupled to the wheel such that the drive lever rotates the wheel, and an engager having a first position and a second position. When the engager is in the first position, the engager transmits torque from the drive lever to the wheel. When the engager is in the second position, the engager decouples the drive lever from the wheel.

In yet another embodiment, a wheelchair drive boost system includes a wheelchair having a first main wheel and a second main wheel, a first wheelchair drive boost assembly having a first drive lever, a first drive wheel frictionally contacting the first main wheel, and a first transmission that couples the first drive lever to the first drive wheel, and a second wheelchair drive boost assembly comprising a second drive lever, a second drive wheel frictionally contacting the second main wheel, and a second transmission that couples the second drive lever to the second drive wheel. A forward movement of the first drive lever causes the first drive wheel to propel the first main wheel forward and a forward movement of the second drive lever causes the second drive wheel to propel the second main wheel forward. The first transmission and the second transmission each multiply the respective forces applied to the first drive lever and the second drive lever to increase a force of the forward movements of the respective first main wheel and second main wheel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
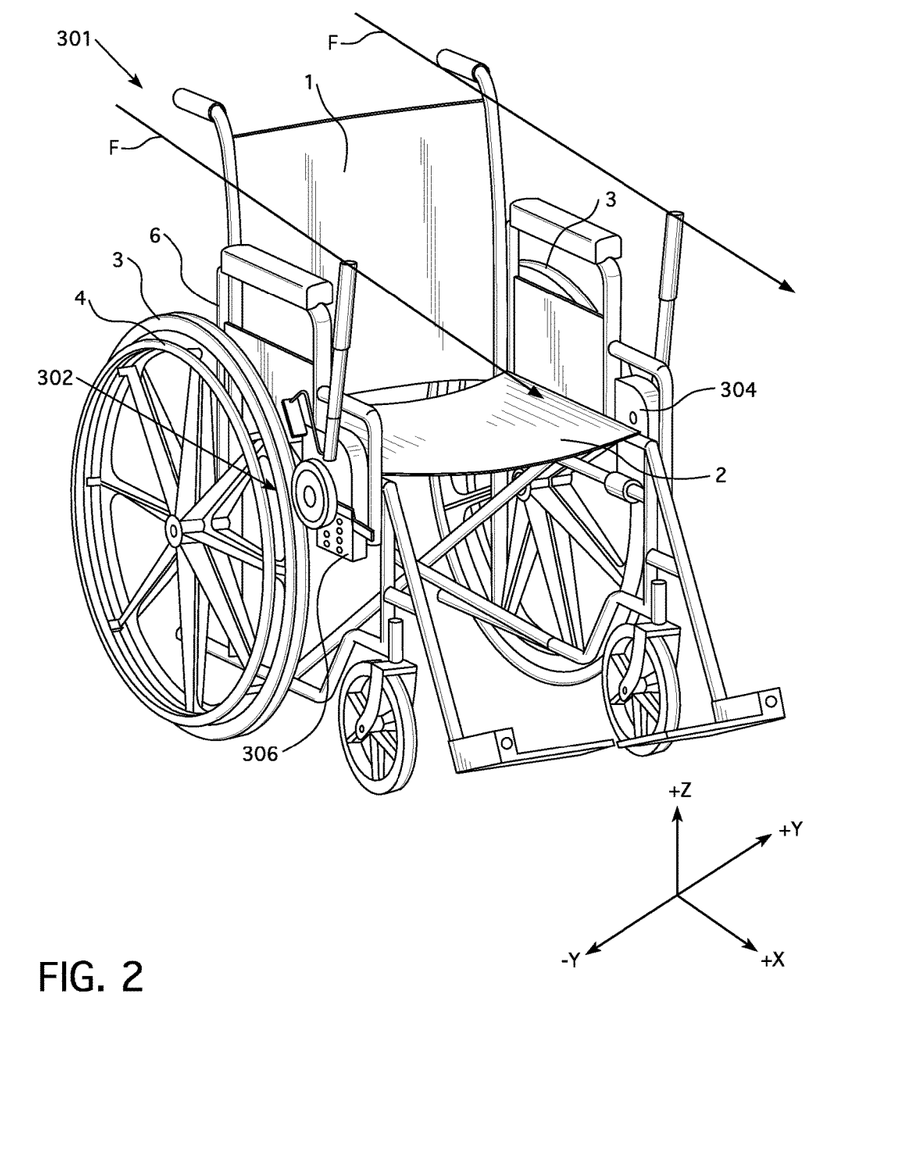
FIG. 2 schematically depicts a front perspective view of an illustrative wheelchair incorporating a drive boost apparatus according to one or more embodiments shown and described herein.

Reference will now be made in detail to embodiments of wheelchair drive boost systems that include one or more wheelchair drive boost apparatuses coupled to a wheelchair and/or drive-assisted wheelchairs, examples of which are illustrated in the accompanying drawings. Whenever possible, the same reference numerals will be used throughout the drawings to refer to the same or like parts. One embodiment of a wheelchair drive boost system is depicted in FIG. 2. A wheelchair drive boost apparatus generally includes a housing, a drive wheel with a drive axis that is movable with respect to the housing, a drive lever that engages with the drive wheel to cause the drive wheel to rotate, a transmission that couples the drive lever and the drive wheel together, and an engager that moves between a first position and a second position to move the drive axis with respect to the housing. Various embodiments of wheelchair drive boost apparatuses will be described herein with specific reference to the appended drawings.

The wheelchair drive boost system described herein allows for a subject, sitting in the wheelchair, to provide additional force to propel the wheelchair over a surface, particularly surfaces that may be difficult to traverse using the standard manual operation of the wheelchair. The wheelchair drive boost system is operable in an on-demand manner such that the drive lever can be pushed in a forward direction by a user, thereby causing the drive boost apparatus to engage with a wheel of the wheelchair and provide temporary extra force to propel the wheelchair in the forward direction. In addition, the wheelchair is capable of normal function when the drive boost apparatus is not used. As will be described in greater detail herein, such a wheelchair drive boost apparatus may be integrated with the wheelchair either as an original part (i.e., installed at the time of wheelchair manufacture) or as an aftermarket part (i.e., installed on an existing wheelchair). As a result, the wheelchair drive boost apparatus allows for additional boost in propelling the wheelchair forward when necessary without hindering the normal function of the wheelchair and does not require any bulky and/or expensive powered components.

As used herein, the term "longitudinal direction" refers to the forward-rearward direction of the wheelchair drive boost system and/or the wheelchair drive boost apparatus (i.e., in the +/− X-directions of the coordinate axes depicted). The term "lateral direction" refers to the cross-direction of the wheelchair drive boost system and/or the wheelchair drive boost apparatus (i.e., in the +/− Y-directions of the coordinate axes depicted), and is transverse to the longitudinal direction. The term "vertical direction" refers to the upward-downward direction of the wheelchair drive boost system and/or the wheelchair drive boost apparatus (i.e., in the +/− Z-directions of the coordinate axes depicted), and is transverse to the lateral and the longitudinal directions. The terms "front end" and "rear end" refer to the relative location of components of the wheelchair drive boost system and/or the wheelchair drive boost apparatus in the longitudinal direction.

The phrase "communicatively coupled" is used herein to describe the interconnectivity of various components of the wheelchair drive boost apparatus and means that the components are connected either through wires, optical fibers, or wirelessly such that electrical, optical, and/or electromagnetic signals may be exchanged between the components.

Figure 1:
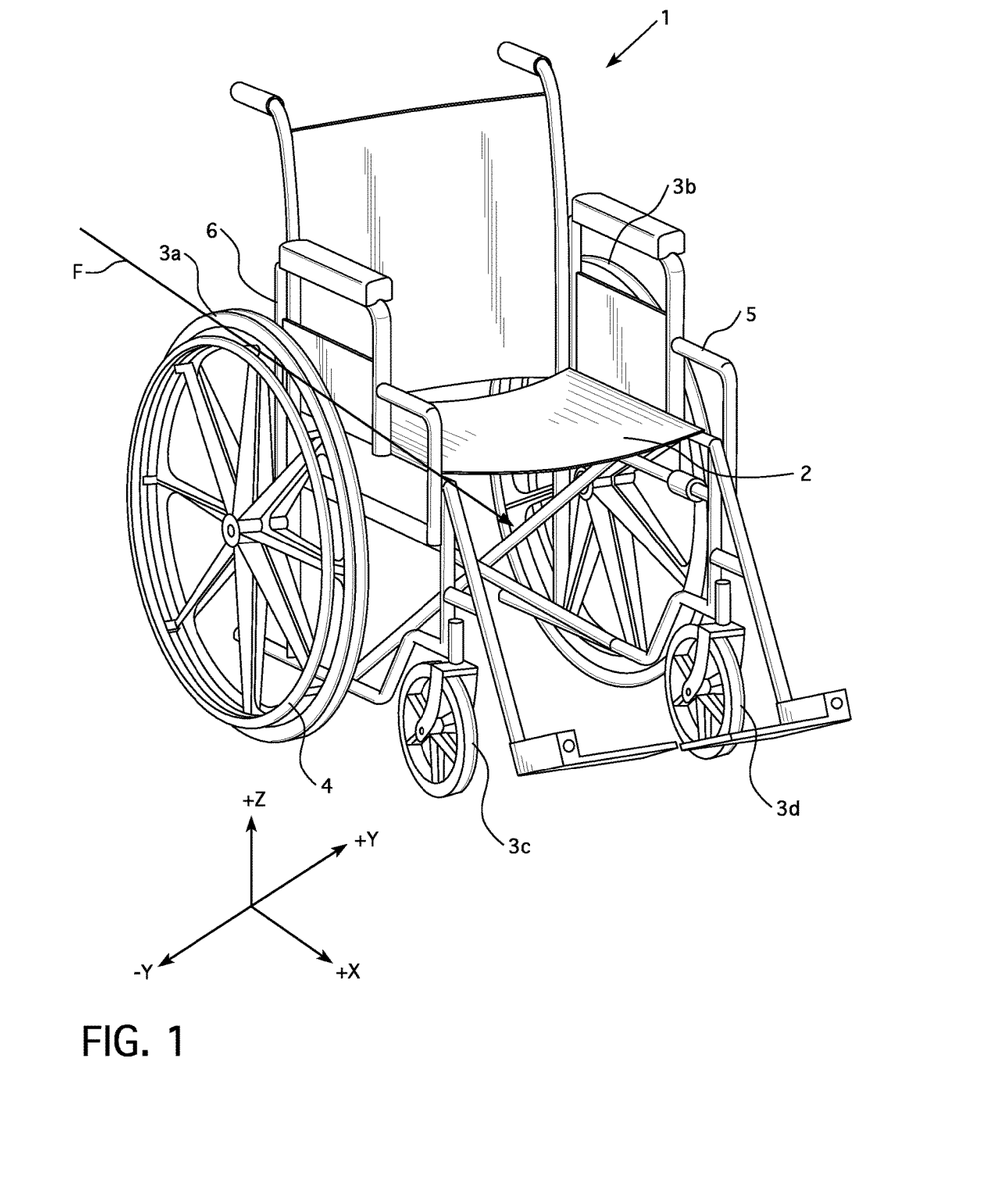
FIG. 1 schematically depicts a side perspective view of an illustrative wheelchair for attachment of a drive boost apparatus according to one or more embodiments shown and described herein.

Referring now to FIG. 1, an illustrative wheelchair, generally designated 1, is depicted. The wheelchair 1 may generally be a conventional manual wheelchair. That is, the wheelchair 1, before attachment of additional apparatuses described herein, may be a typical manually-powered wheelchair that is operable by a user that sits in the wheelchair and provides a force to the wheels thereof. The wheelchair 1 may generally include a wheelchair frame 6 that supports the seat 2. The wheelchair frame 6 is coupled to a plurality of wheels 3a-3d (collectively, 3). Each of a first main wheel 3a and a second main wheel 3b may generally include, or be coupled to, a circular wheel handle 4. The circular wheel handle 4 may extend substantially adjacent to a circumference of the respective main wheel 3a, 3b to which it is attached.

To operate the wheelchair 1, a user may sit on the seat 2 of the wheelchair 1 and may grasp an upper portion of one or more of the circular wheel handles 4 that are coupled to the main wheels 3a, 3b of the wheelchair 1. The user may then provide a forward force F generally in the direction of the +X direction of the coordinate axes depicted to move the wheelchair 1 in the +X direction. Other means of manipulating the wheelchair 1 (such as turning, stopping, and/or the like) by controlling the movement of the main wheels 3a, 3b should be generally understood.

Referring now to FIG. 2, a wheelchair drive boost system 301 may include the wheelchair 1 coupled to one or more wheelchair drive boost assemblies 302, including a first (i.e., left) drive assembly 304 and/or a second (i.e., right) drive assembly 306. The one or more drive boost assemblies 302, which may be referred to as drive boost apparatuses, drive assist assemblies, and drive assist apparatuses interchangeably herein, may allow a user to manually control the wheelchair 1 to negotiate obstacles that would otherwise not be negotiated by the user because such obstacles would require a force beyond the user's strength. Such drive boost assemblies 302 advantageously allow an aged or infirm user to continue with a manual wheelchair (augmented by the drive boost assemblies 302) without the additional limitations to mobility or expense of a powered chair. The first drive boost assembly 304 and the second drive boost assembly 306 may each be removably assembled to the wheelchair 1 using fasteners such as bolts, screws, ties, and/or the like, as described in greater detail herein.

Figure 3:
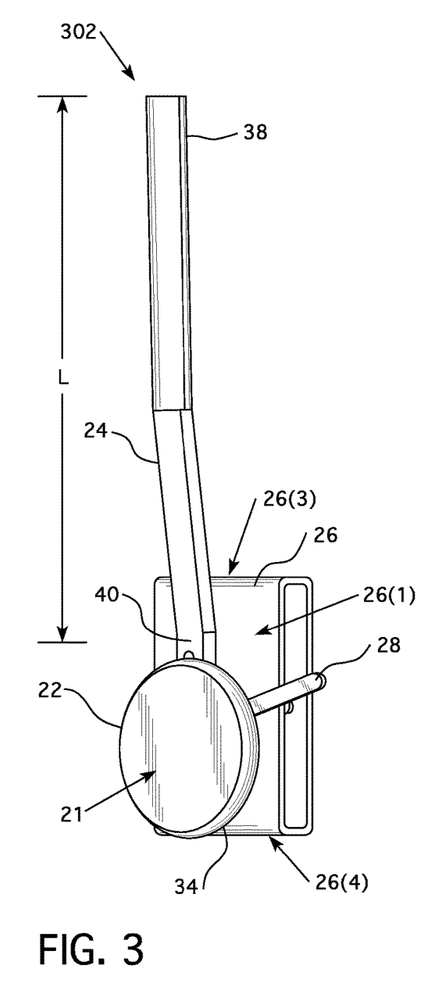
FIG. 3 schematically depicts a first side front perspective view of an illustrative drive boost apparatus according to one or more embodiments shown and described herein.
Figure 4:
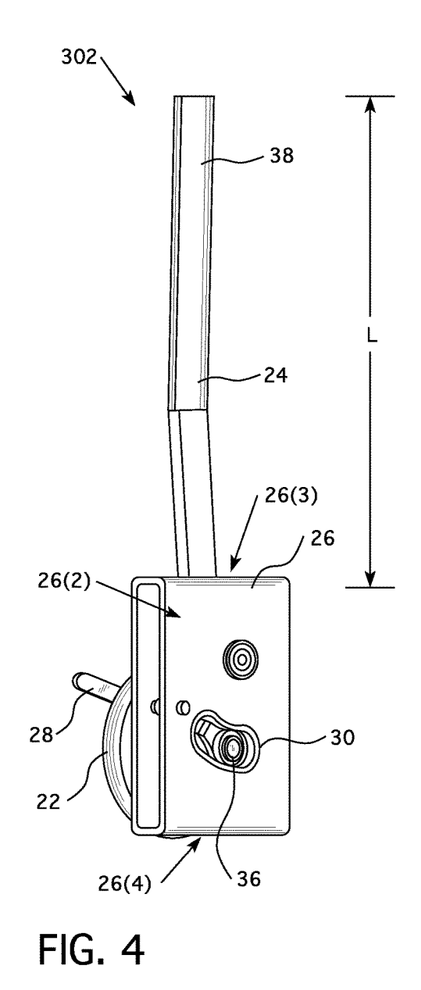
FIG. 4 schematically depicts a second side front perspective view of an illustrative drive boost apparatus according to one or more embodiments shown and described herein.

Referring now to FIGS. 3 and 4, each of the drive boost assemblies 302 may generally include a housing 26 that at least partially contains a drive wheel 22, a lever 24, a transmission (not shown), and an engage lever 28. As will be described in greater detail herein, each of the drive boost assemblies may be arranged such that the lever 24 and the engage lever 28 are coupled to the drive wheel 22, which encapsulates the transmission therein. In addition, referring also to FIG. 2, as the drive boost assemblies 302 may be located on either side of the wheelchair, it should be understood that the first drive boost assembly 304 and the second drive boost assembly 306 may contain the same components, but may be arranged in an opposing manner (i.e., the various components of the first drive boost assembly 304 may be arranged such that they mirror the various components of the second drive boost assembly 306, and vice versa). As such, the description provided hereinbelow relates to one of the drive boost assemblies 302, but the structure and operation of the other of the drive boost assemblies 302 should be apparent.

The housing 26 may include parallel planar surfaces 26(1), 26(2) connected by shorter perpendicular sides 26(3), 26(4) forming an internal cavity that covers one or more portions of the drive boost assembly 302. For example, as shown in FIGS. 3 and 4, the housing 26 may be generally box shaped. However, such a shape and configuration of the housing 26 is merely illustrative. Other shapes, sizes, and configurations are contemplated without departing from the scope of the present application. In some embodiments, the housing 26 may include one or more slots 30 in a surface thereof (such as the planar surface 26(2)). The one or more slots 30 may be shaped and sized such that one or more portions of the drive boost assembly 302 can protrude from the housing 26. In addition, the one or more slots 30 may allow for motion of one or more portions of the drive boost assembly 302 outside the housing 26. In some embodiments, the housing 26 may also have one or more additional openings to accommodate bearings securing one or more portions of the drive boost assembly 302 and/or to secure the drive boost assembly 302 to the wheelchair frame 6 of the wheelchair (FIG. 2).

In various embodiments, the housing 26 may maintain the various components of the drive boost assembly 302 in relationship to one another. That is, the housing 26 may act as a component of the drive boost assembly 302 that holds the drive boost assembly 302 in an assembled form. In some embodiments (such as those illustrated in FIGS. 3-6 and 8), the housing 26 may also protect various components of the drive boost assembly 302 from external interference. For example, the housing 26 may protect various components of the drive boost assembly 302 from objects such as clothing, dirt, or body parts that may interfere with the functionality of the drive boost assembly 302 from getting into the housing 26. Moreover, the housing 26 may also protect the user from contacting various portions of the drive boost assembly 302 that might result in possible pinch hazards from moving parts of a mechanism thereof. The housing 26 may be constructed of any relatively rigid substance, such as, for example, metal, plastic, and/or the like.

Figure 5:
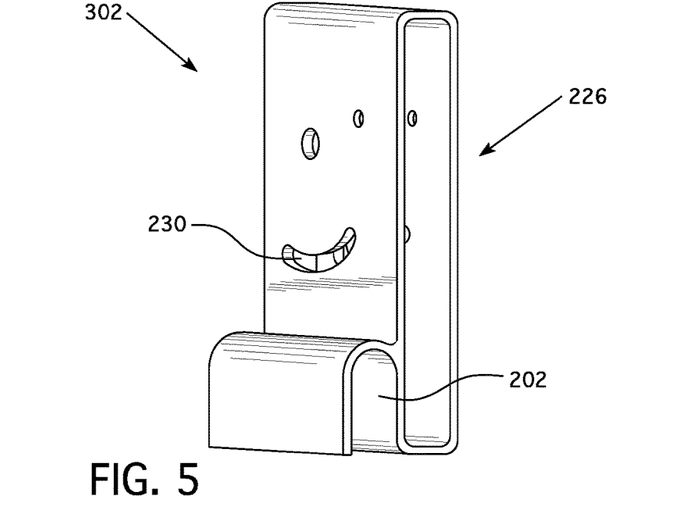
FIG. 5 schematically depicts a first side perspective view of an illustrative housing of a drive boost apparatus according to one or more embodiments shown and described herein.

In some embodiments, as shown for example in FIG. 5 and also referring to FIGS. 1 and 2, the housing 26 may include a frame alignment feature 202 attached to a housing 226 (corresponding to the housing 26 of FIGS. 3-4). The frame alignment feature 202 may be complementary in shape, size, and/or configuration to a mounting location portion 5 of wheelchair frame 6. The frame alignment feature 202 may align and mount the wheelchair drive boost assembly 302 to the wheelchair 1. In some embodiments, the frame alignment feature 202 may define a U-shaped cavity that fits over the mounting location portion 5 of the wheelchair frame 6. One or more holes (not shown) in and around frame alignment feature 202 may allow fasteners such as screws and/or the like (also not shown) to attach the drive assist assembly 302 to the wheelchair 1. Other fastening methods, such as adhesives, binding ties, and/or the like may also or alternatively be used. Such fastening methods may also be used with other embodiments, whether or not specifically described herein. In some embodiments, the wheelchair frame 226 may also include one or more other features described with respect to FIGS. 3-4, including a slot 230 (which corresponds to slot 30).

Figure 6:
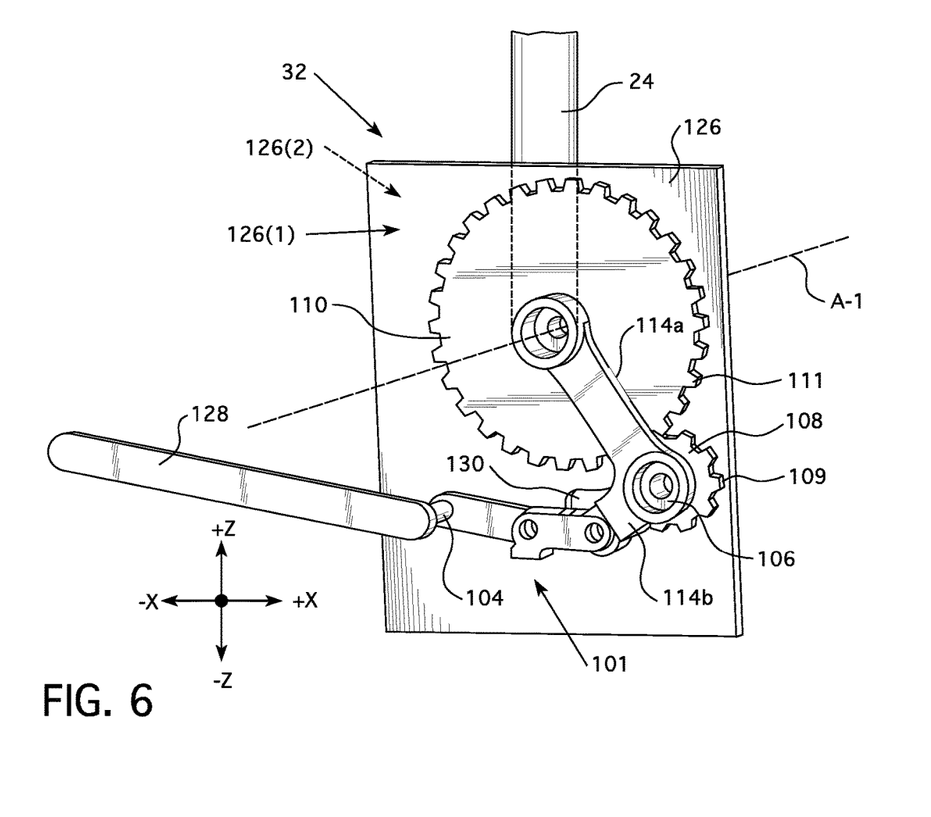
FIG. 6 schematically depicts a second side perspective view of an illustrative drive boost apparatus with certain components removed according to one or more embodiments shown and described herein.

Referring again to FIGS. 3-4, as well as FIG. 6, in some embodiments, the housing 26 may include a planar mounting plate 126. The planar mounting plate 126 may include an arcuate slot 130 extending from a first side 126(1) to a second side 126(2) of the planar mounting plate 126. The arcuate slot 130 may be shaped and sized such that at least a portion of the drive boost assembly 302 is arranged on the first side 126(1) and extends through the arcuate slot 130 to the second side 126(2). The arcuate slot 130 may further be shaped and sized such that the portion of the drive boost assembly 302 that extends therethrough can move within the arcuate slot 130, such as from a first position to a second position, as described in greater detail herein. In addition, in some embodiments, the arcuate slot 130 may work cooperatively with engage lever, as described in greater detail herein.

Referring to FIGS. 2-4, the engage lever 28 may position the drive wheel 22 to apply torque to turn a corresponding main wheel 3 of the wheelchair 1. In the illustrated embodiments, the drive wheel 22 frictionally engages the corresponding main wheel 3. However, it should be understood that such embodiments are merely illustrative. For example, in other embodiments, the drive wheel 22 may be configured to apply torque to the corresponding main wheel 3 of the wheelchair in other ways. One such non-limiting way may include, for example, by enmeshing gear teeth disposed on the drive wheel 22 with complementary teeth that are disposed on main wheel 3 of the wheelchair 1. Frictional engagement of the drive wheel 22 to the main wheel 3 of the wheelchair 1 may have the benefit of a lower cost and of no limitations in relative alignment of the drive wheel 22 and the corresponding main wheel 3 of the wheelchair.

Figure 9:
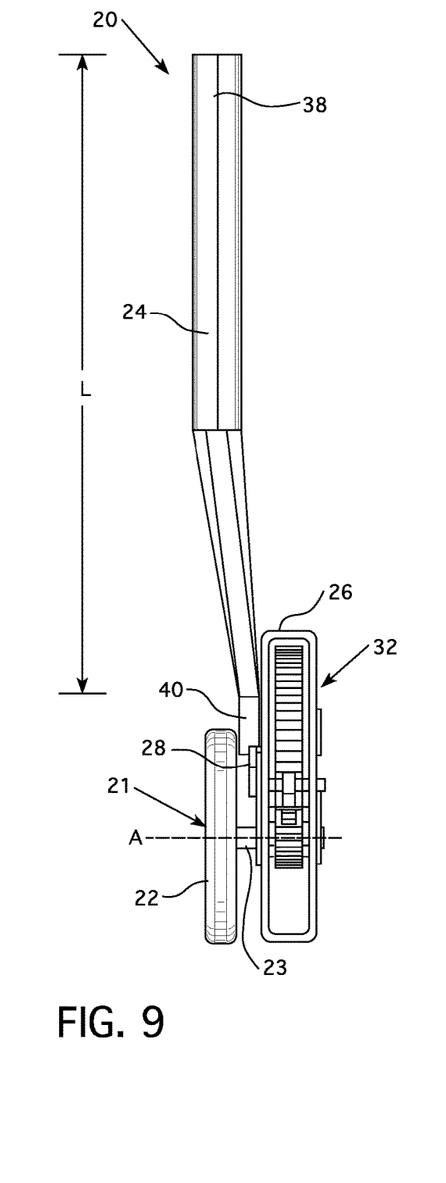
FIG. 9 schematically depicts a front view of an illustrative drive boost apparatus according to one or more embodiments shown and described herein.

In various embodiments, the drive wheel 22 may include a rigid hub member 21 that is covered circumferentially by a compliant tire 34. The hub member 21 may include a metal disk fabricated of a metal, such as, for example, aluminum, steel, and/or the like. Referring also to FIG. 9, the hub member 21 of the drive wheel 22 may include a shaft 23 extending along an axis A of the drive wheel 22 (e.g., an axial shaft). The shaft 23 may generally couple the drive wheel 22 to the transmission 32, which transfers torque from the lever 24 to the corresponding main wheel 3 of the wheelchair 1. In addition, the shaft 23 may engage one or more bearings, such as ball bearings, bushings, or the like, to transfer the torque. In some embodiments, the shaft 23 may pass through one or more of the slots 30 in housing 26 to allow movement of drive wheel 22 by an engager, as described in greater detail herein.

In some embodiments, the shaft 23 may couple to the hub member 21 of the drive wheel 22 through a one-way bearing to permit the drive wheel 22 to deliver torque to the main wheel 3 of the wheelchair 1 only in one direction. That is, the one way bearing transmits torque between the shaft 23 and a bearing housing in one direction only, while also allowing free motion in the opposite direction. As such, when the lever 24 is moved in a first direction, torque may be transferred from the drive wheel 22 to the main wheel 3 of the wheelchair 1. However, when the lever 24 is moved in a second direction (e.g., in a direction opposite the first direction), no torque is transferred. Torque is positively transmitted by rollers that wedge against interior ramps. The one-way bearing permits the lever 24 to be returned to a home position (i.e., by moving the lever in the second direction) without causing the main wheel 3 to back drive. In other embodiments, the shaft 23 may rigidly couple to the drive wheel 22 and a one-way bearing is located in another portion of the transmission 32. For example, the one-way bearing may be disposed between the shaft 23 of drive wheel 22 and a hub of a spur gear 108 (FIG. 6).

Referring now to FIGS. 2-3, the tire 34 provides compliance to take up tolerances in the positioning of the drive wheel 22 with respect to the corresponding main wheel 3 of the wheelchair 1. The tire 34 also increases friction between the drive wheel 22 and the corresponding main wheel 3 of the wheelchair 1. In some embodiments, the tire 34 may include a polyurethane ring that is affixed (e.g., glued, friction fit, or the like) to the hub member 21 of the drive wheel 22. Polyurethane provides a good combination of high strength, elasticity, and low cost in such an application. The rigid hub member 21 allows precise positioning of a contact surface of the tire 34 to the corresponding main wheel 3 of the wheelchair 1. The combination of a compliant tire 34 surrounding a rigid hub member 21 advantageously delivers both precise positioning and high friction. In other embodiments, the drive wheel 22 may rely on the compliance of the corresponding main wheel 3 of the wheelchair 1, which has its own tire, to maintain friction and take up tolerances. In such embodiments, the drive wheel 22 may be rigid and may include a high friction outer surface such as, for example, a knurled profile.

In embodiments where the housing 26 encloses at least a portion of the various components of each of the drive boost assemblies 302, the drive wheel 22 may be located outside an enclosed portion of the housing 26 (e.g., outside the inner cavity of the housing 26) to allow unobstructed access to the main wheel 3 of the wheelchair 1. In such embodiments, the drive wheel 22 may be disposed laterally from the housing 26 in the +Y/−Y directions such that the drive wheel 22 is disposed at a location distally from the seat 2 of the wheelchair 1. That is, the housing 26 may be positioned between the drive wheel 22 and the seat 2 of the wheelchair 1.

The lever 24 is an elongated rigid member that includes a gripping end 38 and an attachment end 40. The gripping end 38 may be roughly cylindrical to allow for an easy grip. However, it should be understood that the gripping end 38 may be any other shape and/or arranged in any other configuration, particularly shapes and/or configurations that provide a suitable means for gripping by a user and moving the lever 24 in the first direction and/or in the second direction. The gripping end 38 may include a handgrip (not shown) and may also include a brake actuator, as described in greater detail herein. The attachment end 40 of the lever 24 may be flattened to more readily fit between closely spaced parts of the wheelchair frame 6 of the wheelchair 1 and the housing 26 of each of the drive boost assemblies 302. In addition, the attachment end 40 may be coupled to the transmission 32 (FIG. 9) to deliver torque supplied by the user when the lever 24 is moved in the first direction.

In various embodiments, the lever 24 may cause the drive wheel 22 to rotate. In some embodiments, the lever 24 may directly cause the drive wheel 22 to rotate by directly connecting the lever 24 to the hub member 21. In other embodiments, the lever 24 may indirectly cause the drive wheel 22 to rotate by indirectly coupling the lever 24 to the drive wheel 22. That is, as shown in FIG. 9, the lever 24 may be coupled to the drive wheel 22 via the transmission 32 to increase a mechanical advantage.

In some embodiments, the lever 24 may telescope or otherwise adjust in length L to accommodate anatomy of individual users (e.g., a user's height, arm length, reach, etc.). In some embodiments, an optimal length L of the lever 24 may be determined by the a particular user's arm length and/or the user's comfortable range of motion. A longer length L of the lever 24 increases the mechanical advantage, thereby delivering more force to drive the drive wheel 22 for each unit of force delivered to the lever 24.

Figure 11:
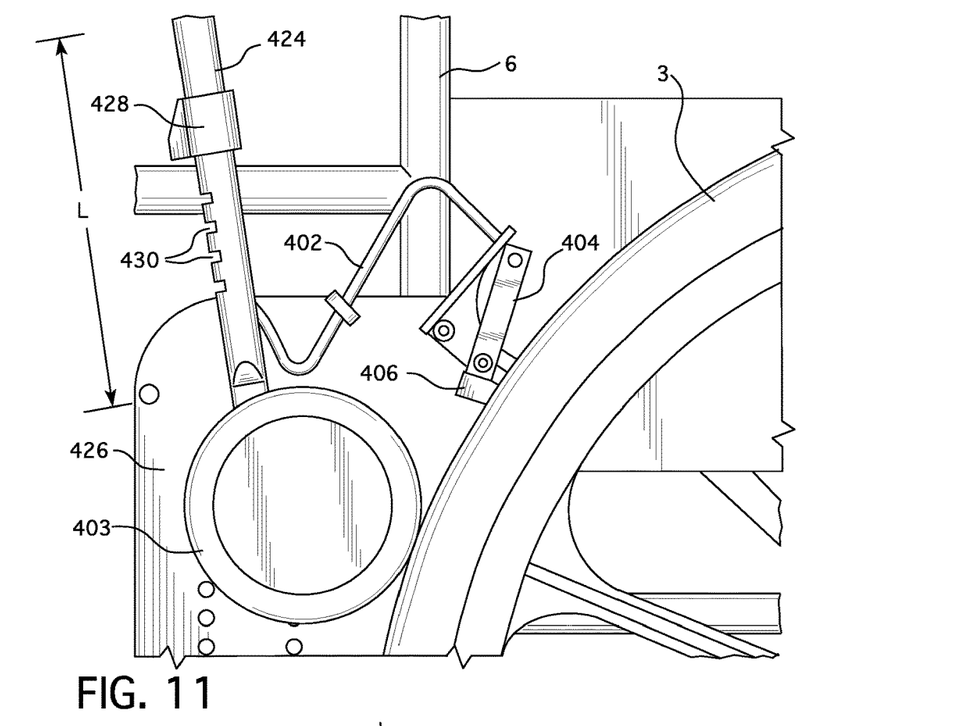
FIG. 11 schematically depicts an illustrative drive boost system including a wheelchair wheel, a brake assembly, and a drive boost apparatus according to one or more embodiments shown and described herein.

In some embodiments, such as that illustrated in FIG. 11, the lever 424 may include an inner tube portion nested inside an outer tube portion. The lever 424 may also include a plurality of lever length detents 430 formed as slots in the inner tube portion of the lever 424 at different positions along the length L of the lever 424. A lever length adjuster 428 attaches to a bottom of the outer tube portion of the lever 424 and includes a compliant latch that mates with one of the plurality of lever length detents 430 to move to a detent position. In operation, a user may set a preferred length of the lever 424 by releasing the latch, sliding the outer tube portion with respect to the inner tube portion to the desired length, and seating the latch of the lever length adjuster 428 in a desired one of the lever length detents 430. It should be understood that the embodiment depicted in FIG. 11 is merely illustrative, and other mechanisms and methods for adjusting the length L of the lever 424 may be used without departing from the scope of the present disclosure.

Referring again to FIGS. 2-3, in some embodiments, the lever 24 may be hollowed out such that various components may be passed through an interior of the lever 24, such as brake cables and/or the like, as described in greater detail herein.

In some embodiments, at least a portion of the lever 24 may extend a distance outside the enclosed portion of the housing 26 such that the lever 24 can be accessed and/or manipulated by a user without obstruction. In such embodiments, the lever 24 may be disposed laterally from the housing 26 in the +Y/−Y directions such that the lever 24 is disposed at a location distally from the seat 2 of the wheelchair 1. That is, the housing 26 may be positioned between the lever 24 and the seat 2 of the wheelchair 1.

Figure 10:
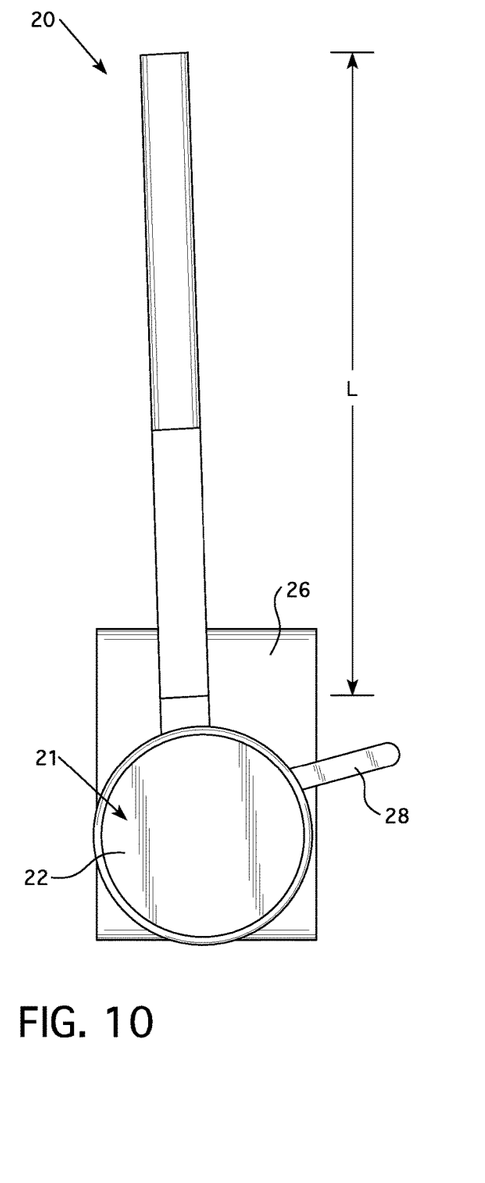
FIG. 10 schematically depicts a first side view of an illustrative drive boost apparatus according to one or more embodiments shown and described herein.

Referring now to FIGS. 2, 9, and 10, the transmission 32 multiplies the user-applied force on the lever 24 to drive the corresponding main wheel 3 of the wheelchair 1 forward (e.g., in the +X direction) at a higher torque than would be possible without the drive boost assemblies 302. As such, the wheelchair 1 may be propelled forward (e.g., in the +X direction over an obstacle, such as a threshold, an uneven floor surface, or the like. The transmission 32 may be any transmission now known or later developed. An illustrative transmission 32 may include, but is not limited to, devices that include gears, a linkage, belts and pulleys, and/or any other mechanism that produces a mechanical advantage. In some embodiments, the total mechanical advantage produced by the combination of the lever 24 and the transmission 32 is at least about 1.5 times greater than an assembly not including the combination of the lever 24 and the transmission 32. In other embodiments, the total mechanical advantage produced by the combination of the lever 24 and the transmission 32 is at least about 2.0 times greater than an assembly not including the combination of the lever 24 and the transmission 32. The higher mechanical advantage allows bigger obstacles to be traversed by the wheelchair 1 when operated by a user that may be less able to apply high forces necessary to overcome such obstacles. The lower mechanical advantage may be suitable for some users and allows a greater distance to be traveled for each unit of applied motion on the lever 24. It should be understood that even in an absence of the transmission 32, the lever 24 alone may provide some degree of mechanical advantage. As previously described herein, the lever 24 can be adjusted in length L to fit an individual user anatomy such that a user with longer arms may experience a greater mechanical advantage. However, to provide mechanical advantage for those with shorter arms or a more limited range of motion, additional transmission elements may be required.

Figure 7:
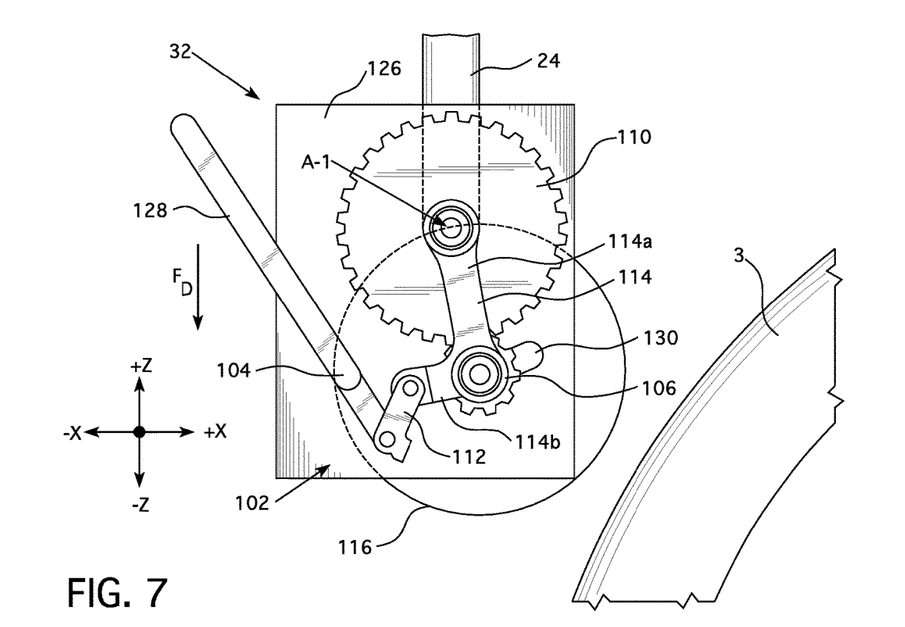
FIG. 7 schematically depicts a second side view of an illustrative drive boost apparatus with certain components removed and in a disengaged position according to one or more embodiments shown and described herein.
Figure 8:
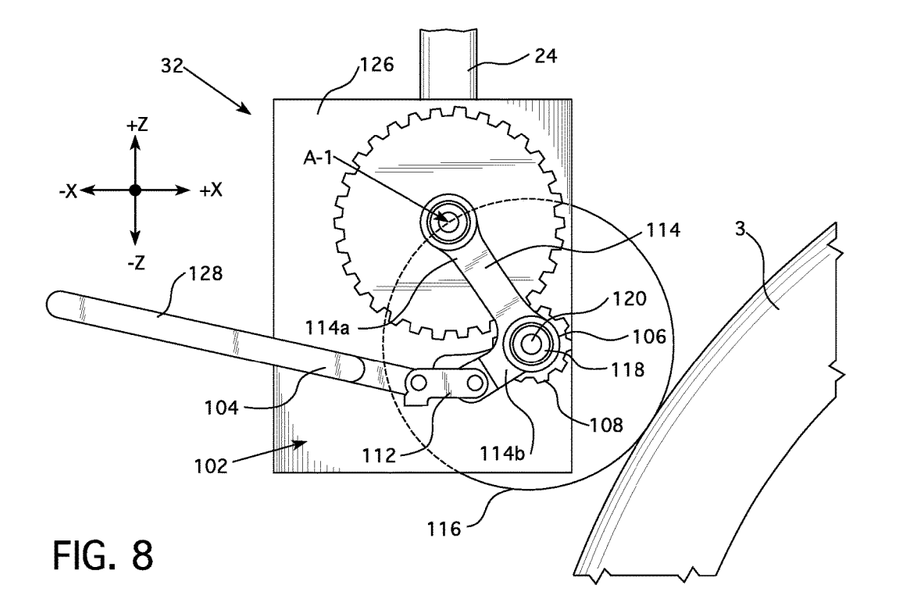
FIG. 8 schematically depicts a second side view of an illustrative drive boost apparatus with certain components removed and in an engaged position according to one or more embodiments shown and described herein.

FIGS. 6-8 depicts additional detail regarding various components of the transmission 32. In some embodiments, the transmission 32 may include a spur gear 108 concentric with the drive wheel 116 and a second gear 110 concentric with the lever 24. The axes of the spur gear 108 and the second gear 110 are substantially parallel with respect to one another. The spur gear 108 has teeth 109 and the second gear 110 has teeth 111. The teeth 109 of the spur gear 108 may intermesh with the teeth 111 of the second gear 110 such that rotation of second gear 110 by the lever 24 causes the spur gear 108 to rotate, which, in turn, rotates the drive wheel 116. The meshing of the gear teeth 109, 111 reverses the direction of rotation so that clockwise rotation of second gear 110 produces counter clockwise rotation of the drive wheel 116. Thus, referring also to FIG. 2, the drive wheel 116, in interacting with the corresponding main wheel 3 of the wheelchair 1, again reverses the direction of rotation so that the corresponding main wheel 3 of the wheelchair 1 and the lever 24 rotate in the same direction (i.e. a force pushing the lever 24 in the +X direction also moves the wheelchair forward in the +X direction).

In some embodiments, the transmission 32 may include additional gears engaged between the spur gear 108 and the second gear 110. Such an addition of other gears may allow the transmission 32 to provide additional mechanical advantage, as described herein.

The degree of mechanical advantage of the drive boost assemblies 302 may be determined by the length L of the lever 24, by the ratio of the number of teeth 109, 111 on the spur gear 108 and the second gear 110, and by the relative size of the drive wheel 116 and the corresponding main wheel 3 of the wheelchair 1. For example, a drive boost assembly 302 having a lever 24 with a length L of about 14 inches, a drive wheel 116 having a diameter of about 2 inches, and a gear ratio of 3:1, the drive boost assembly 302 delivers a 2.33 fold increase in force F as compared to direct pushing on the main wheels 3 at their respective outside diameters.

As described herein, the drive wheel 116 may be attached to the spur gear 108 through a one way bearing that allows a return of the lever 24 to a home position without reversing movement of the wheelchair 1. In some embodiments, a one way bearing may be placed in another location in the transmission 32, such as in the connection between the lever 24 and the second gear 110.

In various embodiments, an engager 101 may position the drive wheel 116 in contact with main wheel 3 to selectively apply a boost when needed. When not needed, the user may adjust the engager 101 to position the drive wheel 116 in a first position away from contact with main wheel 3 (e.g., in a decoupled position). With the engager 101 in this disengaged or decoupled position, a user can drive the wheelchair 1 in a conventional manner by using circular wheel handles 4 (FIG. 1). FIGS. 6-8 depict arrangement and operation of the engager 101 according to an embodiment. As shown in FIGS. 6-8, the engager 101 includes a linkage 102 (e.g., a four-bar linkage) to position the drive wheel 116. It should be understood that the present disclosure is not limited to the depicted engager 101, and other embodiments that use other positioning devices including, but not limited to, other linkages or other types of mechanisms now known or later developed, may be used without departing from the scope of the present disclosure.

The engager 101 includes the engage lever 128, the linkage 102, and the slot 130. As previously described herein, the engage lever 128 may extend through the mounting plate 126 via the slot 130 to permit manipulation by a user. The engage lever 128 may be a drive link of the linkage 102, which, as a four-bar linkage, also includes a second link 112, a third link 114, and a ground link formed by the mounting plate 126. The mounting plate 126 includes the arcuate slot 130 extending through the mounting plate 126 and arranged radially about the axis A-1 of the second gear 110. The engage lever 128 is pivotably mounted to mounting plate 126 at a fulcrum 104 and extends a distance beyond the fulcrum 104 to pivotably mount to the second link 112. A distal end of the second link 112 is pivotably mounted to a first end of the third link 114. The third link 114 may be L-shaped with a long arm portion 114a and a short arm portion 114b. The short arm portion 114b connects to the second link 112 and the long arm portion 114a is pivotably mounted to the mounting plate 126 at the axis A-1 of the second gear 110. A corner of the third link 114 may include a mounting position 106 for the drive wheel 116. The mounting position 106 may accommodate a one-way bearing 118. The mounting position 106 is also concentric with the spur gear 108 and accommodates the shaft 120 of the drive wheel 116. As previously described herein, the drive wheel 116 is located on an opposite side of the mounting plate 126 as the spur gear 108. The shaft 120 of the drive wheel 116 extends through the arcuate slot 130 in the mounting plate 126. A pivoting of the long arm portion 114a of third link 114 constrains motion of the shaft 120 and of the mounting position 106 to an arcuate path. The slot 130 allows the shaft 120 to pass through the mounting plate 126 such that the center of the drive wheel 116 follows the same path defined by the length of the long arm portion 114a of the third link 114. In embodiments having a housing 26 that is box-like, the slot 130 may be present on both sides of the housing 26 with a bearing running on a surface of the slot 130 to provide further stability against offset loads.

While also referring to FIG. 2, FIG. 7 illustrates the engager 101 of FIG. 6 in the disengaged or decoupled position such that the drive wheel 116 does not contact the corresponding main wheel 3. Conversely, FIG. 8 illustrates the engager 101 of FIG. 6 in an engaged or coupled position such that the drive wheel 116 is contacting at least a portion of the corresponding main wheel 3, such as a tire of the corresponding main wheel 3. The illustrations in FIGS. 7-8 show the assembly in an operative orientation. That is, the top of the picture is closer to the top of the wheelchair 1 when installed. In the disengaged state shown in FIG. 7, the engage lever 128 may be at or near its upper limit of rotation. As such, an acute angle is formed between the engage lever 128 and the second link 112, the mounting position 106 is disposed toward the engage handle end of the slot 130, and the projection of the outer diameter of drive wheel 116 is disposed slightly rightward (i.e., towards the +X direction of the coordinate axes depicted in FIG. 7) of the right edge of mounting plate 126. The drive wheel 116, in such a position, may not be in contact with the corresponding main wheel 3 of the wheelchair 1. Accordingly, the drive boost assembly 302 is thus disengaged.

In operation, a user operates the engager 101 by applying a downward force $F_D$ (i.e., towards the −Z direction of the coordinate axes depicted in FIG. 7) on the engage lever 128 in FIG. 7. Such a downward force $F_D$ causes rotation of the engage lever 128 about the fulcrum 104, thereby pushing the second link 112 rightward (i.e., towards the +X direction of the coordinate axes depicted in FIG. 7). This rotates the third link 114 about the axis A-1 of the second gear 110, moving the mounting position 106 (and outer diameter of drive wheel 116) rightward (i.e., towards the +X direction of the coordinate axes depicted in FIG. 7) towards the corresponding main wheel 3.

In the engaged or coupled state of FIG. 8, the engage lever 128 may be at or near its lower limit of rotation. As such, there is nearly a straight angle formed between the engage lever 128 and the second link 112. In addition, the mounting position 106 may be disposed away from the engage handle end of slot 130 and the projection of the outer diameter of the drive wheel 116 is disposed more rightward (i.e., towards the +X direction of the coordinate axes depicted in FIG. 8) of the right edge of mounting plate 126. This motion of the outer diameter of drive wheel 116 brings the drive wheel 116 into contact with the corresponding main wheel 3 of the wheelchair 1, thereby permitting application of drive assist to the corresponding main wheel 3. The near straight angle condition between the engage lever 128 and second link 112 creates a dead point condition that forms a toggle to lock the linkage 102 in place.

In some embodiments, when in the engaged or coupled state of FIG. 8, the drive wheel 116 is frictionally engaged with the corresponding main wheel 3. Thus, rotational movement of the drive wheel 116 causes a corresponding rotational movement of the corresponding main wheel 3, as described in greater detail herein. For example, if the drive wheel 116 rotates in a counterclockwise direction, the frictional engagement with the corresponding main wheel 3 causes an equal and opposite rotation of the main wheel 3 in a clockwise direction. Accordingly, as described in greater detail herein, movement of the lever 24 causes the drive wheel 116 to rotate, which, in turn, causes the corresponding main wheel 3 to rotate in an equal and opposite direction.

In various embodiments, the user may disengage or decouple the engager 101 by applying an upward force (i.e., towards the +Z direction of the coordinate axes depicted in FIG. 8) that is opposite the downward force $F_D$. Such an upward force causes motions in an opposite direction as described hereinabove.

In embodiments with a box-like housing 26 the engage lever 128 may be at least partially disposed outside of the housing with pivot pin at the fulcrum extending through both walls of the housing 26 to provide stability against offset loads.

In some embodiments, at least one of the drive boost assemblies 302 may include a friction brake. The friction brake may include both a soft brake to slow the wheelchair and a hard brake to prevent movement of a main wheel 3 at rest. A soft brake may apply friction to a main wheel 3 by applying a friction pad to the main wheel 3 near the outer diameter of the main wheel 3. This can be on the tire of the main wheel 3, on the side wall of the main wheel 3, or on the circular wheel handle 4.

Figure 12:
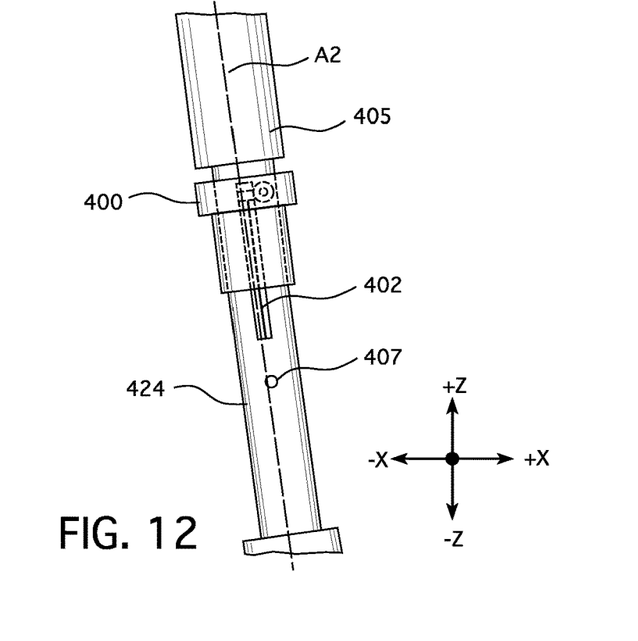
FIG. 12 schematically depicts an illustrative arm portion of a drive boost apparatus including a brake actuator according to one or more embodiments shown and described herein.

Referring now to FIGS. 2 and 11-12, the soft brake includes a brake actuator 400, a cable 402, a brake mechanism 404, and a friction pad 406. The brake actuator 400 acts on the brake mechanism 404 by applying tension to the cable 402 (shown within a sheath in FIG. 11 but visible in FIG. 12). An illustrative brake actuator may form a collar 405 surrounding the lever 424. The lever 424 may have a hollow interior and is pierced by a slot 407 that is perpendicular to a longitudinal axis A-2 of the lever 424. A pin (not shown) crosses the diameter of the collar 405 and traverses the lever 424. The cable 402 attaches to the pin such that, as the collar 405 is raised closer to a gripping end of lever 424 (e.g., generally towards the +Z direction of the coordinate axes depicted in FIG. 12), tension is applied to the cable 402. Thus, collar 405 may function as a brake effector for the brake actuator 400.

The brake mechanism 404 may respond to tension on the cable 402 by moving the friction pad 406 into contact with main wheel 3. The friction pad 406 is disposed on a first brake lever attached via a pivoting connection to the housing 426. The first brake lever provides a mechanical advantage of about five to one to reduce the force required to slow the wheelchair 1.

A user may apply the soft brake by sliding the brake actuator 400 toward the gripping end of lever 424 (e.g., generally towards the +Z direction of the coordinate axes depicted in FIG. 12), thereby placing tension on the cable 402. The amount of friction depends on how strongly the user slides the braking actuator 400. The user can gauge the amount of force to apply in each situation. The soft brake may include a spring that releases cable tension when the user releases the brake actuator 400. Alternatively, the brake actuator 400 may include a second brake lever pivotably mounted to the first brake lever. In this alternative embodiment, the soft brake functions as a squeezable hand brake.

The brake actuator 400 may include a full engagement detent that includes an extension of each slot 407 circumferentially at the upper end of the slots 407. A user may apply the hard brake by sliding the brake actuator 400 toward the gripping end of the lever 424 (e.g., generally towards the +Z direction of the coordinate axes depicted in FIG. 12). Once the brake actuator 400 is pulled fully up, the user may twist the collar 405 horizontally to lock the brakes and the wheelchair 1 in place. Such a twisting action rotates the pin out of the linear portion of the slot 407 and into the circumferential slot extension. In some embodiments, the circumferential slot terminates in a second vertical slot that projects downward (e.g., away from the gripping end of lever 424 generally towards the −Z direction of the coordinate axes depicted in FIG. 12) for at least half the pin diameter to provide a detent.

In various embodiments, the brake actuator 400 may remain proximate the corresponding main wheel 3 irrespective of the position of the engager 101 (FIG. 6). Thus, both hard and soft brakes remain useable as long as the assembly 302 is attached to the wheelchair 1, regardless of whether the drive wheel 116 is engaged. This location of brake actuators on the levers 424 advantageously allows the user to brake the wheelchair without grabbing moving parts such as the circular wheel handles 4. Because both soft and hard brake actuators are located away from the moving parts, the design may eliminate safety concerns associated with such movement.

The hard brake may be used to lock a corresponding main wheel 3 of the wheelchair 1 to prevent its rotation. This may be useful when the wheelchair is on a slope, when the user is transferring into or out of the wheelchair, or to position the wheelchair at a fixed location, such as at a dining table or the like. While most wheelchairs include a wheel lock device, in some embodiments this may be removed to more readily mount the drive boost assemblies.

Referring to FIG. 2, in operation, the installed drive boost assemblies 302 may permit a user to advance the wheelchair 1 with greater force than would be possible if the user directly push the main wheels 3. A user may also turn the wheelchair by applying more force to the first drive boost assembly 304 than to the second drive boost assembly 306 drive to cause a first corresponding main wheel 3 to move more than a second corresponding main wheel 3. In embodiments including brake assemblies, a user may slow or lock one or both wheels by applying the respective brake assemblies.

In order to move forward over an obstacle, a user may push both levers on either side of the chair forward (i.e., generally towards the +X direction of the coordinate axes depicted in the figures). The levers are connected to their respective drive wheels by a gear train that allows for about a 2:1 advantage when comparing force output on the wheels to force input by the user. The levers can then be pulled back freely and pushed forward again to continue their motion. This free rotation when moving the levers backwards is achieved by using a one way bearing on the drive wheel. When the levers are pulled back, the drive wheel's shaft may rotate without moving the wheel, but when the lever is moved forward, the shaft will transmit force to the wheel. Steering and turning can be achieved by manually pushing different amounts on either side of the chair. The user can disengage the drive assist at any time by raising the engage lever and using the chair normally. Some users may prefer to keep the drive assist engaged at all times.

In order to slow down the wheelchair, the user may pull upwards on the brake actuator collar. The further the collar is pulled up, the more forceful the stop. If the collar is pulled fully up, it can also be twisted horizontally to lock the brakes and the chair in place.

Accordingly, it should now be understood that the apparatuses, systems, and methods described herein may be used to provide additional force in propelling a wheelchair forward, particularly in instances where the wheelchair must traverse difficult terrain. The additional force that is provided by the assemblies disclosed herein may be multiplied by the assemblies such that a user who would otherwise be unable to propel the wheelchair forward due to weakness, infirmity, age, or the like, can easily move the wheelchair forward. In addition, such assemblies as described herein can be installed at the time of manufacture of the wheelchair or may be attached to the wheelchair as an aftermarket part.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheelchair drive boost apparatus comprising:
a housing;
a drive wheel comprising a drive axis, wherein the drive axis is movable with respect to the housing;
a drive lever that engages with the drive wheel to cause the drive wheel to rotate;
a transmission that couples the drive lever to the drive wheel via a gear train disposed between the drive lever and the drive wheel, the gear train comprising a first gear spur concentric with the drive lever and a second gear spur concentric with the drive wheel, wherein the drive wheel is coupled to the transmission via a one-way engagement mechanism that permits free rotation of the drive wheel with respect to the drive lever in a first direction and constrains rotation of the drive wheel with respect to the drive lever in a second direction opposite the first direction; and
an engager having a first position and a second position, wherein the engager is configured to move the drive axis with respect to the housing.

2. The wheelchair drive boost apparatus of claim 1, wherein the wheelchair drive boost apparatus is coupled to a wheelchair.

3. The wheelchair drive boost apparatus of claim 1, wherein the engager in a first position disposes the drive wheel in contact with a wheel of a wheelchair.

4. The wheelchair drive boost apparatus of claim 1, wherein the engager in the second position disposes the drive wheel out of contact with a wheel of a wheelchair.

5. The wheelchair drive boost apparatus of claim 1, wherein:
the housing comprises a planar side having a slot; and
the drive wheel includes an axial shaft that moves within the slot in response to movement of the engager.

6. The wheelchair drive boost apparatus of claim 1, wherein the engager comprises an engage lever and a linkage that couples the engager to the drive wheel.

7. The wheelchair drive boost apparatus of claim 6, wherein the linkage is a four-bar linkage and the engage lever, when located in the first position, is at or near a dead point condition.

8. The wheelchair drive boost apparatus of claim 1, wherein the one-way engagement mechanism is a one-way bearing.

9. The wheelchair drive boost apparatus of claim 1, further comprising a friction brake, wherein the friction brake comprises:
a brake actuator disposed in the drive lever; and
a brake effector selectively positionable with respect to the housing.

10. A drive-assisted wheelchair comprising:
a main wheel; and
a drive boost apparatus removably engagable with the main wheel, the drive boost mechanism comprising:
a housing,
a drive wheel comprising a drive axis, wherein the drive axis is movable with respect to the housing,
a drive lever that engages with the drive wheel to cause the drive wheel to rotate,
a transmission that couples the drive lever to the drive wheel via a gear train disposed between the drive lever and the drive wheel, the gear train comprising a first gear spur concentric with the drive lever and a second gear spur concentric with the drive wheel, wherein the drive wheel is coupled to the transmission via a one-way engagement mechanism that permits free rotation of the drive wheel with respect to the drive lever in a first direction and constrains rotation of the drive wheel with respect to the drive lever in a second direction opposite the first direction, and an engager having a first position and a second position, wherein the engager is configured to move the drive axis with respect to the housing.

11. The drive-assisted wheelchair of claim 10, wherein the engager in a first position disposes the drive wheel in contact with the main wheel.

12. The drive-assisted wheelchair of claim 10, wherein the engager in a second position disposes the drive wheel out of contact with the main wheel.

13. The drive-assisted wheelchair of claim 10, wherein the one-way engagement mechanism is a one-way bearing.

14. The drive-assisted wheelchair of claim 10, further comprising a friction brake, wherein the friction brake comprises:
    a brake actuator disposed in the drive lever; and
    a brake effector selectively positionable with respect to the housing.

15. A wheelchair drive boost system comprising:
    a wheelchair comprising a first main wheel and a second main wheel;
    a first wheelchair drive boost assembly comprising a first drive wheel having a movable drive axis and frictionally contacting the first main wheel, a first drive lever that engages with the first drive wheel to cause the first drive wheel to rotate, and a first transmission that couples the first drive lever to the first drive wheel via a first gear train disposed between the first drive lever and the first drive wheel, the first gear train comprising a first gear spur concentric with the first drive lever and a second gear spur concentric with the first drive wheel, wherein the first drive wheel is coupled to the first transmission via a first one-way engagement mechanism; and
    a second wheelchair drive boost assembly comprising a second drive wheel having a movable drive axis and frictionally contacting the second main wheel, a second drive lever that engages with the second drive wheel to cause the second drive wheel to rotate, and a second transmission that couples the second drive lever to the second drive wheel via a second gear train disposed between the second drive lever and the second drive wheel, the second gear train comprising a first gear spur concentric with the second drive lever and a second gear spur concentric with the second drive wheel, wherein the second drive wheel is coupled to the second transmission via a second one-way engagement mechanism,
    wherein:
        a forward movement of the first drive lever causes the first drive wheel to propel the first main wheel forward and a forward movement of the second drive lever causes the second drive wheel to propel the second main wheel forward, and
        the first transmission and the second transmission each multiply forces applied to the first drive lever and the second drive lever to increase a force of the forward movements of the respective first main wheel and second main wheel.

16. The wheelchair drive boost system of claim 15, wherein at least one of the first one-way engagement mechanism and the second one-way engagement mechanism is a one-way bearing.

17. The wheelchair drive boost system of claim 15, further comprising a friction brake, wherein the friction brake comprises:
    a brake actuator disposed in one or more of the first drive lever and the second drive lever; and
    a brake effector.

* * * * *